United States Patent [19]

Yorgiadis

[11] 4,416,163

[45] Nov. 22, 1983

[54] STRAIN GAGE LOAD CELL INSENSITIVE TO EXTERNAL PRESSURE

[76] Inventor: Alexander Yorgiadis, 1404 Garza St., Anaheim, Calif. 92804

[21] Appl. No.: 269,904

[22] Filed: Jun. 3, 1981

[51] Int. Cl.³ .......................... G01L 1/22; G01L 1/26
[52] U.S. Cl. .............................. 73/862.65; 73/862.63; 73/862.67
[58] Field of Search .................. 73/730, 765–767, 73/862.63, 862.65, 862.67

[56] References Cited

U.S. PATENT DOCUMENTS

| | | | |
|---|---|---|---|
| 2,420,148 | 5/1947 | Ostergren | 73/730 X |
| 2,466,034 | 4/1949 | Mathews | 73/862.63 X |
| 2,920,880 | 1/1960 | Laycock | 73/862.65 |
| 3,365,689 | 1/1968 | Kutsay . | |
| 4,203,318 | 5/1980 | Yorgiadis . | |

Primary Examiner—Charles A. Ruehl
Attorney, Agent, or Firm—Eugene E. Geoffrey, Jr.

[57] ABSTRACT

A strain gage load cell for the measurement of axial loads under variable ambient pressure conditions which includes a tubular member having strain gages on the inner wall thereof and arranged to react uniformly to ambient pressure and non-uniformly to an axial load.

7 Claims, 10 Drawing Figures

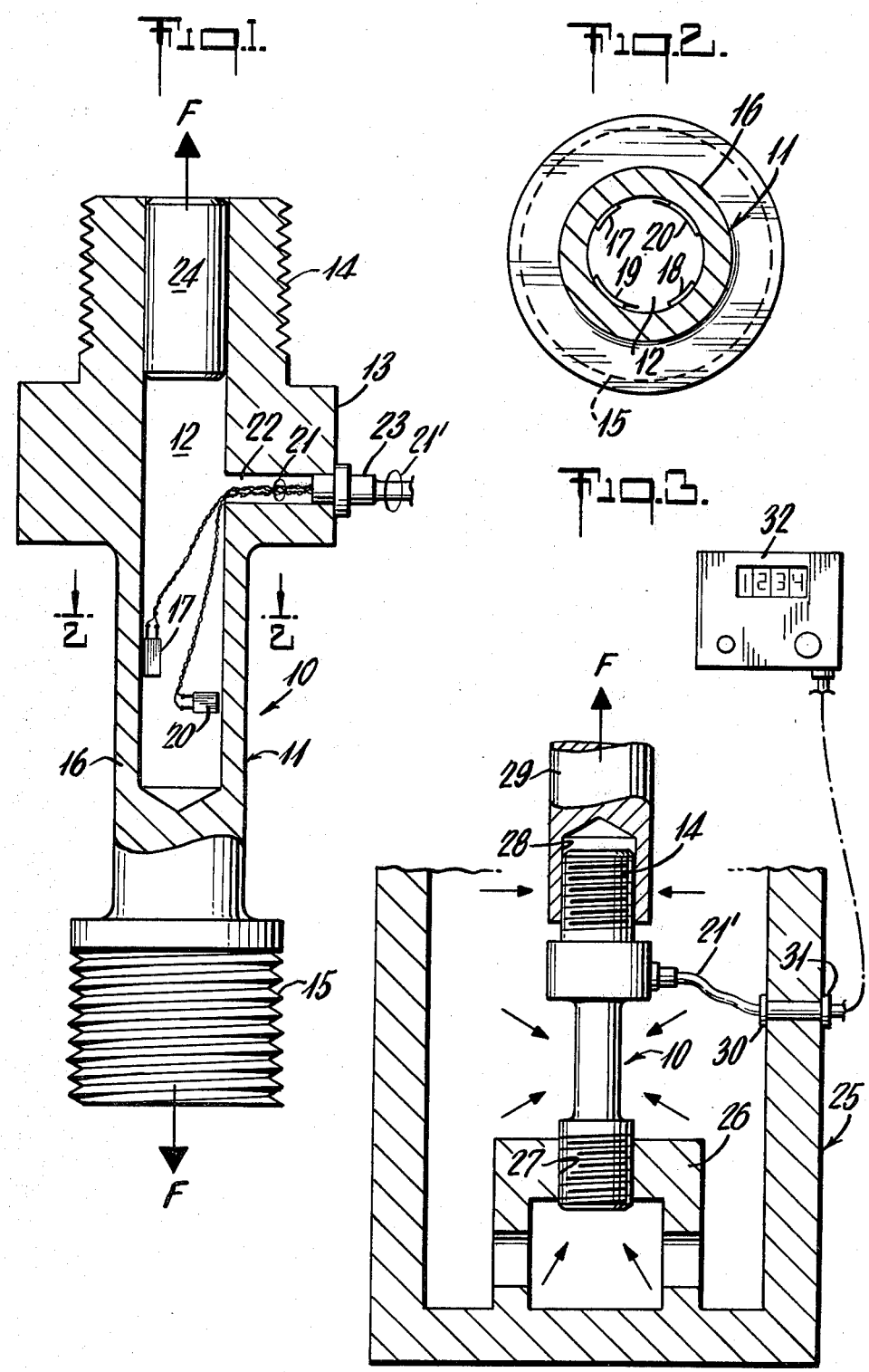

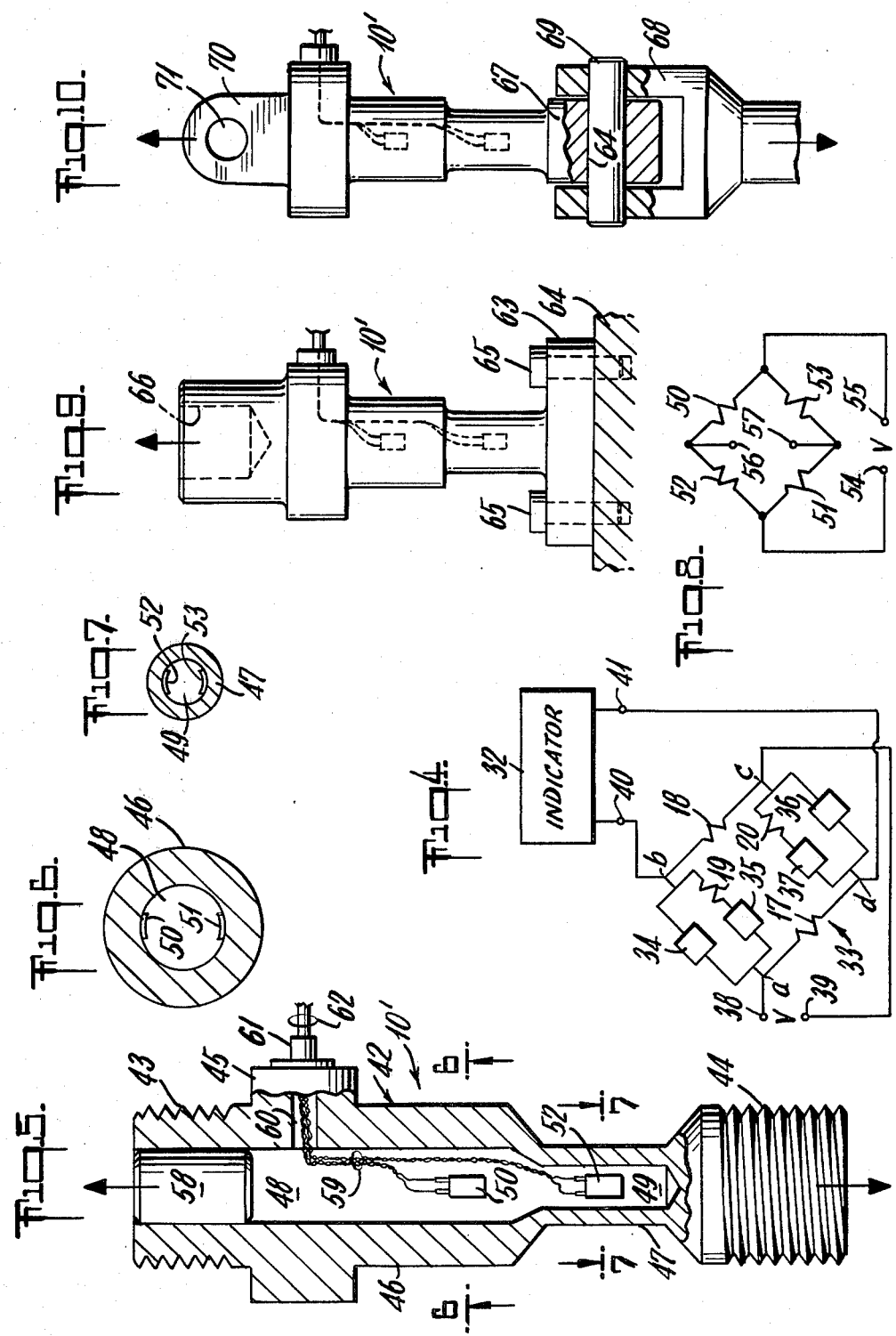

STRAIN GAGE LOAD CELL INSENSITIVE TO EXTERNAL PRESSURE

This invention relates to strain gage load cells and more specifically to a novel and improved load cell useful not only in environments at normal atmospheric pressure but also in environments experiencing pressures both above and below atmospheric pressure.

Strain gage load cells are well known in the art and are used to measure both tensile and compressive loads in a great variety of applications. In some instances, the load cells may be required to measure tensile or compressive loads in atmospheres both above and below normal atmospheric pressure. Normally, such pressures are not of a great magnitude and the influence on the load measurement is generally negligible. However, when subjecting conventional load cells to extremely high or low external pressures, the external pressure will adversely affect the load cell to such an extent that a false indication will be received even in the absence of an applied load. In cases where high pressures of the order of 2,000 to 10,000 pounds per square inch are experienced, the indicated output can exceed the load to be measured depending on the cell design. Known procedures for cancelling the effect of external pressures seriously complicates the measurement procedure and often results in substantial errors. In addition, costs are increased substantially since the external pressures must be measured separately and the effect on the load cell corrected. In extreme cases involving very high pressures and low capacity load cells, the errors and corrections may be so great that the task becomes impossible.

This invention overcomes the difficulties heretofore encountered in existing load cells and provides a novel and improved cell embodying means for automatically cancelling the effect of external pressures. This is attained by a novel and improved arrangement and organization of the gages and associated circuitry which automatically cancels the effects of external pressures.

Another object of the invention resides in the provision of a novel and improved load cell wherein the load cells and associated circuitry are arranged to effect cancellation of external pressures.

A still further object of the invention resides in the provision of a novel and improved load cell embodying an improved geometry and arrangement of strain gages to effect cancellation of external pressures.

The above and other objects of the invention will become more apparent from the following description and accompanying drawings forming part of this application.

IN THE DRAWINGS

FIG. 1 is a cross sectional view of one embodiment of a load cell in accordance with the invention;

FIG. 2 is a cross sectional view of FIG. 1 taken along the line 2—2 of FIG. 1;

FIG. 3 illustrates a typical installation in partial section of the load cell shown in FIG. 1 together with a pressure indicator coupled thereto;

FIG. 4 illustrates a wiring diagram of a bridge circuit embodying the strain gages and is useful in connection with the load cell as illustrated in FIGS. 1 through 3.

FIG. 5 is a cross sectional view of a load cell similar to FIG. 1 and illustrating a modified embodiment of the invention;

FIGS. 6 and 7 are cross sectional views of FIG. 5 taken along the lines 6—6 and 7—7 thereof;

FIG. 8 is the wiring diagram of the bridge circuit for use with the embodiment of the invention shown in FIGS. 5 through 7; and FIGS. 9 and 10 are elevational views illustrating modified arrangements for applying axial loads to load cells of the type illustrated in FIGS. 1 and 5.

When tubular structures having closed ends are subjected to external pressures exceeding atmospheric pressure, the inside wall of the tube centrally of the ends is subjected to compressive strains which can be approximated by the following equations:

$$\text{Axial strain: } e_a = \frac{0.40p}{E\left(1 - \frac{d^2}{D^2}\right)} \text{ inches/inch}$$

Circumferential strain: $e_c = 4.25\, e_a$ inches/inch
where:
E = Modulus of elasticity of tube material = 30 million psi for steel
D = Outside diameter of the tube
d = Inside diameter of the tube
p = The external pressure in pounds per square inch.

The foregoing equations are generally correct in the case of relatively long tubes but in any event exact values for a given tubular structure can be obtained by a simple pressure test. It will be observed however that the strain on the inside of the tubular member is a function of the ratio of the inside and outside diameters of the tube and is not affected by the absolute values of the diameters. With tubes having lengths of the order of several times the inside diameter, the ratio of the circumferential strain to the axial strain will be approximately 4.25 though it will be less than 4.25 with tubes having a smaller length to inside diameter ratio.

The embodiment of the invention illustrated in FIGS. 1 through 4 illustrates one arrangement for automatically cancelling the effect of external pressure on a tubular load cell. While the load cell illustrated in FIGS. 1 through 3 is of cylindrical construction, the same principles apply for tubular load cells having other cross sectional configurations.

In FIGS. 1 through 3, the load cell is generally denoted by the numeral 10 and has an elongated body 11 having a hole 12 bored through the upper portion of the body. The upper portion of the body has a cylindrical portion 13 of relatively large diameter and a threaded end portion 14. The lower end of the body 11 has a threaded portion 15 and it together with the threaded portion 14 provides means for applying a load to the cell. As will be shown, other means for applying loads to the load cell in accordance with the invention are equally adaptable. That portion of the body between the cylindrical portion 13 and the threaded portion 15 and denoted by the numeral 16 is of somewhat reduced diameter and constitutes the stress sensitive region of the load cell. Four strain gages 17 through 20 are securely affixed to the wall of the hole 12 and within the strain sensitive region. The strain gages 17 and 18 are placed in diagonally opposite positions to sense axial strain while the gages 19 and 20 are at right angles to the gages 17 and 18 and angularly spaced therefrom by approximately 90 degrees. The gages 19 and 20 are also positioned diagonally one relative to the other but arranged to sense circumferential strain. Lead wires generally denoted by the numeral 21 extend from each of the four strain gages and extend upwardly through an opening 22 in the cylindrical housing portion 13 and through a plug 23 which seals the opening 22. The wires 21 are arranged in the form of a cable 21' as they emerge from the plug 23 and the cable is used to connect the strain gages to suitable recording and/or indicating apparatus. The hole 12 in the body 11 of the load cell is closed by a plug 24 to seal the opening 12 and protect the strain gages from contamination from the atmosphere and also functions in combination with the plug 23 to hermetically seal the opening 12.

One example of an application of the load cell shown in FIG. 1 is illustrated in FIG. 3. In this instance, the cell is installed wholly within a pressure vessel 25 shown in fragmentary cross sectional form. The vessel includes an adaptor 26 having a threaded opening 27 therein for threadably engaging the lower end 15 of the load cell. The upper end 14 of the load cell threadably engages an opening 28 in an upwardly extending rod 29 to which an axial load is applied and denoted by the letter F. The arrows within the pressure vessel 25 indicate the presence of a high external pressure which is applied to the sides as well as the ends of the strain gage. The cable 21' extends through the wall of the vessel 25 which is sealed by suitable plugs 30 and 31 and thence to indicating apparatus 32.

The improved bridge circuit embodying the strain gages as illustrated in FIG. 1 is shown in FIG. 4. The bridge generally denoted by the numeral 33 is in the nature of a Wheatstone bridge having four junctions a, b, c and d with the individual legs of the bridge connected to form in essence a closed loop. More specifically, the strain gage 17 is connected between the junctions d-a while the strain gage 18 is connected between the junctions b-c. The strain gage 19 is arranged in a series—parallel circuit containing resistors 34 and 35 and the series—parallel circuit forms a third leg of the bridge connected between the junctions a and b. The fourth leg of the bridge includes the strain gage 20 and resistors 36 and 37 connected in a series—parallel arrangement with the strain gage 20 and forms the fourth leg of the bridge connected between junctions c and d. In this illustration, the resistors 34 through 37 have been indicated in the form of blocks in order to avoid confusion with the strain gages 17 through 20 which are indicated as resistance elements. An energizing voltage V is applied to terminals 38 and 39 which are connected to the junctions a and c respectively. The output signal from the bridge is obtained from junctions b and d which are fed throughout the terminals 40 and 41 to the indicator 32. With this arrangement and if the resistors 35 and 37 have a value approximately 1.062 times the resistance of the strain gages 19 and 20 and if the resistors 34 and 36 have resistances approximately 1.942 times the resistance of the strain gages, then in the presence of external pressure the influence of strain gages 19 and 20 will be reduced 4.25 times and the resultant change of resistance in legs a-b and c-d will be identical or substantially identical to the change in resistance in the legs b-c and a-d containing strain gages 17 and 18. Accordingly, the bridge will remain in a balanced condition notwithstanding changes or the magnitude of the external pressure and axial loads will be precisely measured. By way of example, if four strain gages 17 through 20 are each 350 ohms, then resistors 35 and 37 would be approximately 371.5 ohms and the resistors 34 and 36 approximately 679.7 ohms. It is of course possible to make the resistors 34 through 37 adjustable to compensate for normal manufacturing tolerances so that precise cancellation of the effects of the external pressure can be achieved.

In the illustrated embodiment of the invention, the resistors 34 through 37 would be included as part of the indicator 32 and this would be particularly the case with the utilization of small load cells. With larger load cells, it would be possible to include the resistors within the load cell proper.

With the load cell as described above in an ambient pressure atmosphere, the axial gages 17 and 18 will experience a decrease in resistance due to external pressure. The circumferential gages 19 and 20 however will experience a compressive strain which is approximately 4.25 times the axial strain and will also experience a decrease in resistance. However, since the sensitivity of gages 19 and 20 have reduced sensitivity by reason of the series and parallel resistors 34 through 36, the bridge will remain balanced since all legs of the bridge will change uniformly. Upon the application of a tensile load, gages 17 and 18 will experience an increase in resistance while gages 19 and 20 will decrease in resistance. The bridge will therefore be unbalanced and produce a voltage at terminals b-d proportional to the load. It follows that the load cell will function similarly in the measurement of compressive loads. In actual practice, it is generally desirable to determine the exact value of the resistors 34 through 37 experimentally for a given load cell by subjecting the cell to pressure and adjusting the values until the pressure effect is cancelled. It will also be understood that the resistors 34 and 36 may also be connected in parallel with the strain gages 19 and 20 respectively while the resistors 35 and 37 are connected in series with the gages 19 and 20.

A modified embodiment of the invention is illustrated in FIGS. 5 through 7. The load cell denoted by the numeral 10' is substantially identical to the load cell described in connection with FIG. 1 except for the fact that the load cell of FIG. 5 has two strain sensitive regions and the gages are similarly mounted in each region. More specifically, the body 42 has upper and lower threaded portions 43 and 44 for applying a load to the cell. An annular collar-like portion 45 adjoins the threaded end portion 43 and two strain sensitive regions 46 and 47 are provided. A hole 48 is drilled through the body 42 and extends to the junction of the two strain sensitive regions 46 and 47. An opening of smaller diameter 49 is formed coaxially with the opening 48 and extends from the base of the opening 48 throughout the length of the strain sensitive region 47. Strain gages 50 and 51 are affixed to the wall of the opening 48 in alignment with the axis of the cell and arranged in diagonally opposite positions and a second set of strain gages 52 and 53 are affixed to the wall of the opening 49 in alignment with the axis of the cell and at diagonally opposite positions. The strain gages are all oriented to sense the axial strains and are connected in a bridge configuration as illustrated in FIG. 8 with the operating voltage V being applied to the terminals 54 and 55 with the bridge output being obtained from the terminals 56 and 57. The hole 48 in the load cell 10' is closed by a plug 58 and the wires 59 from the strain gages extend through an opening 60 in the body portion 45 and emerge through a plug 61 and is carried within the cable 62 extending from the plug 61.

From the equations previously set forth, it is evident that the axial strain sensed by strain gages mounted on the inner wall of a long tube of uniform diameter is a function of the external pressure and the ratio of the square of the inside diameter to the outside diameter of the tube. With the embodiment of the invention shown in FIG. 5, the strain sensitive regions 46 and 47 are both provided with the same ratio of inside to outside diameter so that the outside diameters with ambient pressure change in the same ratio as the inside diameters and accordingly gages 50-51 and 52-53 will record identical strains when subjected to external pressure whether such pressure is above or below the atmospheric pressure. Since the two sets of gages will be identically affected by external pressure, the bridge as shown in FIG. 8 will remain balanced at all times. Upon the application of an axial load on the load cell of FIG. 5, the axial stress on the strain sensitive region 47 will be much greater than the axial stress on the strain sensitive region 46 since the region 46 has a much larger area of material than the section 47. Accordingly, the strain gages 52 and 53 will indicate a much higher strain than the gages 50 and 51 and accordingly the bridge will become unbalanced and produce an output in proportion to the load applied to the load cell.

In each of the embodiments of the invention described above, the sensitivities of the load cells were adjusted by electrical or mechanical means so that both sets of gages in each instance were subjected to the same strain as the result of external pressure but reacted non-uniformly when subjected to axial strain. In FIG. 1, for example, identical strain gages were utilized with the strain gages 19 and 20 positioned at right angles to the strain gages 17 and 18 and the sensitivity of the strain gages 19 and 20 reduced so that they reacted under circumferential strain in the same manner as gages 17 and 18 reacted to axial strain. It is of course evident that this result may be accomplished by appropriate selection of the characteristics of the strain gages 17 and 18 as compared with the strain gages 19 and 20.

FIGS. 9 and 10 illustrate modified means for applying a load to load cells such as the load cell illustrated in FIG. 5 for instance. In FIG. 9, the load cell 10' is provided with a transverse flange 63 secured to a member 64 by bolts 65 and the upper end of the load cell 10' is provided with a threaded recess 66 for attachment of the load. In FIG. 10, the load cell 10' has the lower end 67 formed in the shape of a lug having a transverse opening 68 therein and it is coupled to a yoke 68 by means of a transverse pin 69. The upper end portion 70 is also in the form of a lug having an opening 71 therein for attachment to a cooperating yoke. It is therefore evident that the load cells shown in either FIG. 1 or 5 may be arranged for any type of attaching means for applying axial loads to the load cell.

While only certain embodiments of the invention have been illustrated and described, it is understood that alterations, changes and modifications may be made without departing from the true scope and spirit thereof.

What is claimed is:

1. A strain gage load cell for the measurement of axial loads comprising a tubular member having a longitudinal opening therein and means for applying said axial load longitudinally thereof, at least two strain gages mounted on the inner surface of the wall defining said opening, means for connecting said gages to an indicator to sense axial strain applied to said member, and means for modifying the sensitivity of one of said gages relative to the other to cause said gages to react uniformly in response to circumferential strain and non-uniformly to said axial load.

2. A strain gage load cell for the measurement of axial loads comprising a tubular member having a longitudinal opening therein and means for applying said axial load longitudinally thereof, at least two strain gages mounted on the inner surface of the wall defining said opening, means for connecting said gages to an indicator to sense axial strain applied to said member, and means for modifying the sensitivity of one of said gages relative to the other to cause said gages to react uniformly in response to circumferential strain and non-uniformly to said axial load, said strain gages are each principally sensitive to strain applied in one direction thereto, said gages are mounted with one gage positioned with said one direction in line with said axial load and the other gage substantially at 90° thereto to render it principally sensitive to circumferential strain, and said modifying means comprises electrical means interconnected with said other strain gage to decrease its sensitivity to circumferential strain to equal the sensitivity of said first gage to circumferential strain whereby said gages will respond uniformly to ambient pressure and non-uniformly to axial loads.

3. A strain gage load cell for the measurement of axial loads according to claim 2 wherein said electrical means comprises resistors interconnected with said other gage to effect said reduction in circumferential sensitivity and maintain the sensitivity of said other gage and resistor combination substantially equal to the sensitivity of said one gage to ambient pressure.

4. A strain gage load cell for the measurement of axial loads according to claim 3 wherein said other gage is desensitized by a factor of approximately 4.0 to 5.0.

5. A strain gage load cell for the measurement of axial loads according to claim 3 including at least two pairs of said strain gages with the gages of one pair being mounted in said one direction and the other pair being mounted at 90° thereto and said pairs of gages are connected to form a bridge with the gages of said one pair being in diagonally opposite legs of said bridge and the gages of said other pair being in the remaining legs of said bridge, resistors interconnected with both gages of said other pair of gages to reduce the sensitivity thereof, and an indicator connected to said bridge.

6. A strain gage load cell for the measurement of axial loads comprising a tubular member having a longitudinal opening therein and means for applying said axial load longitudinally thereof, at least two strain gages mounted on the inner surface of the wall defining said opening, means for connecting said gages to an indicator to sense axial strain applied to said member, and means for modifying the sensitivity of one of said gages relative to the other to cause said gages to react uniformly in response to circumferential strain and non-uniformly to said axial load, said tubular member includes two strain sensitive regions with the wall thickness of said tubular member in one region being greater than the wall thickness in the other region and wherein the ratios of the inside diameter to the outside diameter in each of said regions are equal and one of said gages is fixed to the wall of said opening in one region and the other of said gages is fixed to the wall of said opening in the other region whereby said gages will respond uniformly to ambient pressure and non-uniformly to axial loads.

7. A strain gage load cell for the measurement of axial loads according to claim 6 including at least two pairs of said strain gages with one pair of said gages being affixed to the wall of said opening in one region and the other pair of gages being affixed to the wall of said opening in the other region and said pairs of gages being connected to form a bridge with the gages of one pair forming two diagonally opposite legs of the bridge and the gages of the other pair forming the remaining legs of the bridge and an indicator is connected to the bridge and provides an indication of axial strain whereby said bridge will remain balanced in the presence of ambient pressure and will be unbalanced upon the application of an axial load, the degree of unbalance being a measure of said load.

* * * * *